R. H. McLAIN.
MOTOR CONTROL SYSTEM.
APPLICATION FILED MAY 14, 1921.
1,394,922.
Patented Oct. 25, 1921.
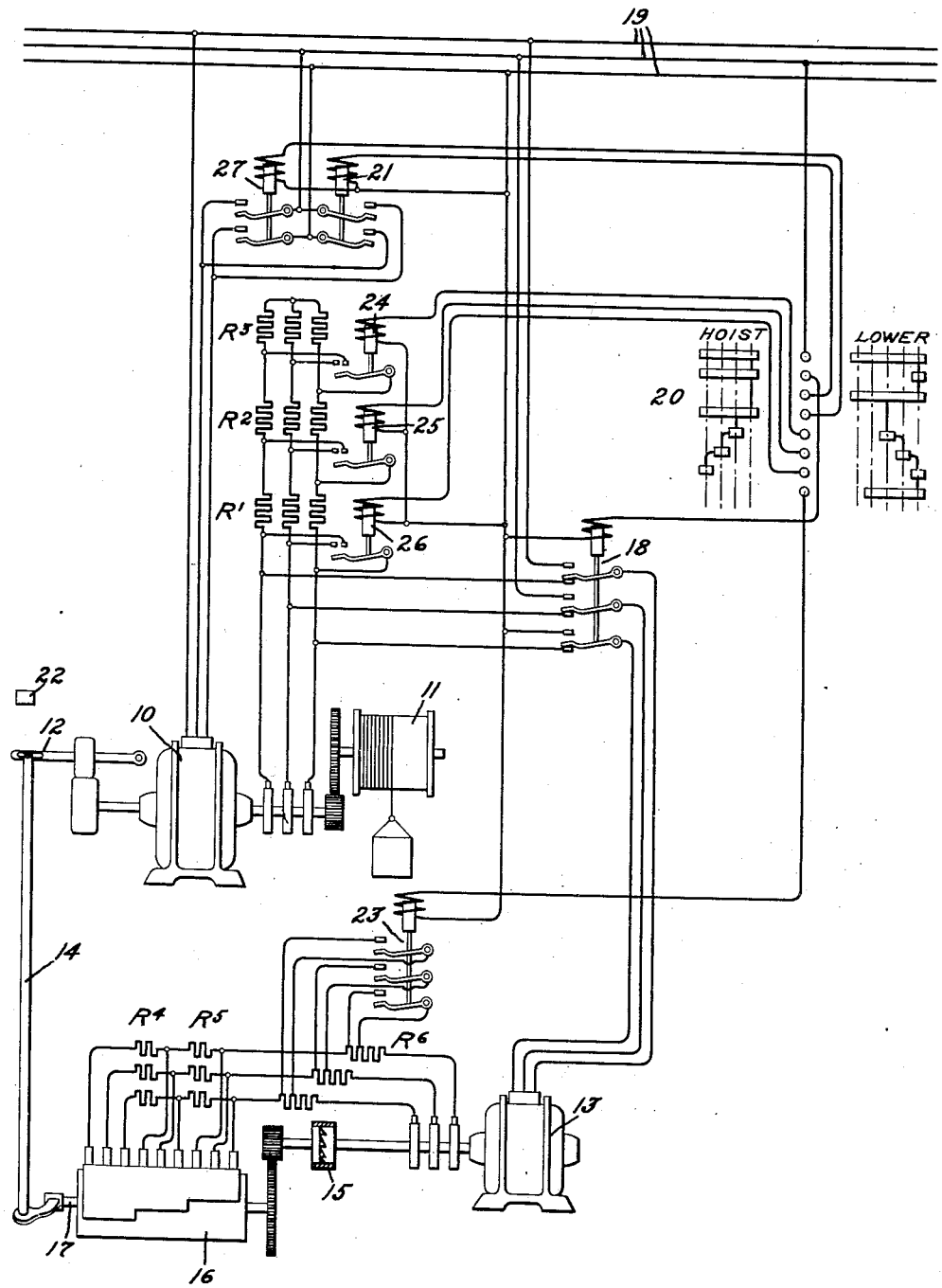
Inventor:
Robert H. McLain,
by Albert G. Davis
His Attorney.

UNITED STATES PATENT OFFICE.

ROBERT H. McLAIN, OF SCHENECTADY, NEW YORK, ASSIGNOR TO GENERAL ELECTRIC COMPANY, A CORPORATION OF NEW YORK.

MOTOR-CONTROL SYSTEM.

1,394,922.   Specification of Letters Patent.   Patented Oct. 25, 1921.

Application filed May 14, 1921. Serial No. 469,592.

*To all whom it may concern:*

Be it known that I, ROBERT H. MCLAIN, a citizen of the United States, residing at Schenectady, county of Schenectady, State of New York, have invented certain new and useful Improvements in Motor-Control Systems, of which the following is a specification.

My invention relates to the control of electric motors, and has for its object the provision of improved means whereby an electric motor may be stopped, started and generally controlled in a reliable, simple and efficient manner.

Although my invention is not necessarily limited thereto, it has a particular application in the control of electric motors for operating hoisting apparatus. For the control of hoisting apparatus it is frequently desirable that a definite position of the controller shall correspond to a definite speed of the motor, both during hoisting and during lowering.

In my prior Patent No. 1,334,774, dated March 23, 1920, I have described and claimed a motor control for an electric motor involving the use of an electromagnetic brake which is controlled in such a way that the speed of the hoist for any position of the controller is always of substantially the same value regardless of the load on the motor. Where a large amount of power is involved and the load of the hoist is apt to be comparatively large, a solenoid controlled brake leaves something to be desired because of the fact that it is expensive to build, to operate, and to maintain. The present invention relates to improvements of my former arrangement whereby an electric motor may be employed for relieving a normally applied brake for the main motor instead of using the solenoid controlled brake shown and described in my said patent.

In carrying my invention into effect in one form, I employ a normally applied brake for the main motor and cause this brake to be relieved by means of an electric motor which is energized in such a way that its torque will vary inversely as the speed of the main motor. The arrangement is such that at starting, the brake motor will be energized to fully relieve the brake on the main motor, and as the main motor increases in speed, the brake will be increasingly applied, so that the speed of the main motor for any position of the controller will always be substantially the same regardless of the load on the main motor.

While the invention is capable of general application, it is particularly useful in connection with alternating current motors of the slip ring type which are very commonly employed for operating hoists. Where an alternating current motor is used, the brake motor, which may also be of the slip ring type, will be energized from the rotor circuit of the main motor. A resistance in the rotor circuit of the brake motor is controlled by means of the brake motor in such a way that after the brake motor has operated to a certain limit, its torque is automatically decreased irrespective of the speed of the main motor. The resistance of the rotor circuit of the brake motor is also directly under the control of the operator, so that by moving his controller, the operator is able to vary at will the braking effect applied to the main motor and thereby vary at will the speed of the main motor.

For a better understanding of my invention, reference is had to the accompanying drawings in which I have shown a very simplified diagram of a motor control system embodying my invention for purposes of illustration, and in which the main electric motor 10 of the slip ring type is provided with resistors $R^1$, $R^2$ and $R^3$ in its rotor circuit. This motor is adapted to drive the hoisting drum 11 through the gearing shown. A normally applied brake 12, shown very diagrammatically as a weight attached to a lever and adapted to bear on a friction wheel on the shaft of the motor 10, is provided for regulating the speed of the main motor. The braking effect is controlled by means of a braking motor 13 which is connected to the link 14 secured to the brake lever by means of the gearing shown and the clutch 15, the arrangement being such that the brake motor will operate the brake lever only in the direction to release the brake, and the brake motor will be driven by the brake when the torque on the brake motor is insufficient to maintain the brake in a relieved position. In the embodiment of the invention shown in the drawings, the brake motor is of the slip ring alternating current type, and resistors $R^4$, $R^5$ and $R^6$ are connected in the rotor circuit thereof to regulate the torque of the brake motor and thereby regulate the braking effect. The arrangement is such that the resistors $R^4$ and $R^5$ are controlled by means of the brake motor by means of a drum controller 16 connected to the shaft 17 which operates the link 14. The resistor $R^6$ is adapted to be controlled at the will of the operator so as to thereby regulate the braking effect as the operator desires. The primary of the brake motor 13 is adapted to be normally connected to the rotor circuit of the main motor 10 by means of the two-position electromagnetic switch 18. During hoisting, however, the switch 18 is energized to connect the brake motor directly to the source of supply 19 so as to fully relieve the brake on the main motor. The main motor and the brake motor are adapted to be controlled by means of the master controller 20 having a neutral or off position and hoisting and lowering positions on opposite sides of the neutral position.

As thus constructed and arranged, and with the parts in the various positions shown in the drawings, the operation of my invention is as follows: In order to lower the load, the master controller 20 is turned to the left to the first position, thereby energizing the contactor 21 to connect the motor to the source of supply 19 for the lowering direction. Since the braking motor 13 is connected directly to the secondary or rotor circuit of the main motor 10, and the resistors $R^1$, $R^2$ and $R^3$ are all included in the rotor circuit of the main motor, the brake motor will be energized to give its maximum torque and thereby operate the link 14 to raise the brake lever. The upward movement of the brake lever is arrested by means of the stop 22, and the position of this stop is such that the link 14 cannot be moved past its dead center position. Before the stop 22 has been reached, the drum controller 16 will be operated by the motor to successively include the resistors $R^5$ and $R^4$ in the rotor circuit of the brake motor, thereby automatically reducing the torque of the brake motor and rendering the brake motor more sensitive to changes of speed of the main motor. As the main motor increases in speed, the voltage and the frequency of the current supplied to the brake motor will decrease correspondingly in a well understood manner, thereby reducing the torque of the brake motor as the main motor speeds up. As the torque of the brake motor is reduced, the brake 12 on the main motor is applied with increasing force to maintain a substantially definite speed for the main motor.

If the speed of the main motor is lower than desired, the master controller 20 will be moved to its second lowering position to energize the electromagnetic switch or contactor 23 to short circuit a portion of the resistor $R^6$ in the rotor circuit of the brake motor, thereby increasing the torque of the brake motor and causing a lesser braking effect to be applied to the main motor. It will be understood that while I have shown but one manually controlled step in the control of the resistance of the rotor circuit of the brake motor, other steps may be provided as desired in order to obtain a greater degree of control of the braking effect of the main motor by the operation of the master controller 20. In order to further increase the speed of the main motor 10, the master controller 20 will be moved to its third lowering position at which the contactor 24 is energized to short circuit the resistor $R^3$ in the rotor circuit of the main motor. A definite speed will be obtained for this position of the controller by reason of the fact that the brake motor 13 will cause a braking effect to be applied to the main motor which will correspond to the speed of the main motor. Moving the master controller to its fourth lowering position will cause the contactor 25 to be energized to short circuit the resistor $R^2$, and moving the braking controller to the final or fifth position will cause the contactor 26 to be energized to short circuit the resistor $R^1$. In the last lowering position of the master controller, the contactor 18 will be energized to connect the brake motor 13 directly to the supply circuit so as to fully relieve the brake from the main motor and permit the highest operating speed for lowering, which will be approximately the cynchronous speed of motor 10. If a lower speed is desired, the operator will return the master controller to the fourth lowering position, thereby connecting the brake motor in cascade with the main motor and causing the braking effect to be in accordance with the speed of the main motor. By moving the master controller back and forth throughout its definite lowering positions, the speed of the hoist may be controlled with great nicety and a substantially definite speed will be obtained for each position of the controller substantially independent of the load on the hoist.

When the master controller is returned to the off position, the main motor and the brake motor will both be deënergized and the brake 12 will be applied simultaneously to the main motor. That will cause the link 14 to turn the drum controller 16 to the position shown in the drawings, that in which the resistors $R^4$ and $R^5$ are short circuited, and the clutch 15 will slip at a small torque so that the motor 13 will revolve in the opposite direction almost free of the drum 16. This is desirable for the reason that if a slip connection were not provided between the brake 12 and the brake motor shaft, the inertia of the rotor of the brake motor would set up strains in the apparatus due to the motor armature attempting to apply the brake with greater force after it had already been applied. The clutch 15 prevents such an action because of the fact that it will drive in one direction only and will slip at about 10% torque when the brake motor tries to press the brake down hard.

My invention has the advantage that the brake motor 13 is a standard piece of apparatus which has been developed in a great number of sizes, and it is a comparatively simple matter to select a brake motor of the proper size to meet the requirements of any particular hoisting equipment. Furthermore, the brake motor 13 is efficient because of the fact that it has a small air gap, whereas an electromagnetic brake is required to have a considerable air gap in order to operate properly. That means that the electromagnetic brake will require more power for controlling a brake of a given size than the brake motor 13. It is also to be observed that the brake motor with its control can be more cheaply manufactured in large sizes, is more reliable in operation and is less affected by wear of the parts than an electromagnetic brake.

In order to operate the main motor 10 to hoist the load, the master controller 20 is thrown to the right from its neutral position to thereby energize the line contractor 27 to connect the main motor directly to the source of supply 19 and also simultaneously connect the brake motor 13 to the source of supply. The brake 12 is thereupon fully relieved and the lever of the brake comes into engagement with the stop 22 to arrest further movement of the brake lever. The resistors $R^4$ and $R^5$ will be successively included in the rotor circuit of the brake motor to limit the torque of the brake motor and to limit the hammer blow effect when the lever of the brake 12 strikes the stop 22. The speed of the hoist in the hoisting direction may be controlled by moving the master controller 20 throughout its successive operating positions, thereby energizing the contactors 24, 25 and 26 in succession to short circuit the resistors $R^3$, $R^2$ and $R^1$ respectively in succession.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is,—

1. The combination with a main electric motor, of means for controlling the same comprising a normally applied brake, a motor for relieving the brake, and means whereby the said motor is energized to deliver a torque which decreases as the main motor speeds up.

2. The combination with a main electric motor, of means for controlling the same comprising a normally applied brake, a motor for relieving the same, a controller, and connections whereby the brake motor is energized to produce a torque which varies inversely as the speed of the main motor, and the torque of the brake motor is regulated by the said controller.

3. The combination with a main electric motor of the slip ring type, of means for controlling the same comprising a normally applied brake, a motor of the slip ring type connected to the slip rings of the main motor for relieving the said brake, and a resistance in the rotor circuit of the brake motor controlled by the brake motor for regulating the torque of the brake motor.

4. The combination with a main electric motor of the slip ring type, of means for controlling the same comprising a normally applied brake, a motor of the slip ring type adapted to be connected to the slip rings of the main motor for relieving the said brake, a controller for the said motors, and a resistance in the rotor circuit of the brake motor controlled by the brake motor and by the said controller.

5. The combination with a main electric motor, of means for controlling the same comprising a main motor of the slip ring type and a starting resistance in the rotor circuit, a normally applied brake for the main motor, a motor of the slip ring type adapted to be connected to the slip rings of the main motor for relieving the said brake, a controller, a resistance in the rotor circuit of the brake motor controlled by the brake motor, and connections whereby the brake motor is energized to fully relieve the brake when the main motor is energized for operation in one direction, and the brake motor is connected to the slip rings of the main motor and the resistance of the rotor circuit of the brake motor is controlled by the brake motor and by said controller when the main motor is energized for operation in the opposite direction.

6. The combination with a main electric motor, of means for controlling the same comprising a normally applied brake, a motor for relieving the brake, a clutch between the motor and the brake arranged to permit the motor to relieve the brake and to prevent the motor from operating to apply the brake beyond a certain degree, and means whereby the said motor is energized to deliver a torque to relieve the brake which decreases as the main motor speeds up.

In witness whereof I have hereunto set my hand this 12th day of May, 1921.

ROBERT H. McLAIN.